(12) United States Patent
Smith

(10) Patent No.: US 7,137,632 B2
(45) Date of Patent: Nov. 21, 2006

(54) FORCE LIMITING WORKPIECE HOLDING DEVICE

(75) Inventor: Roger R. Smith, Erin, NY (US)

(73) Assignee: Hardinge Inc., Elmira, NY (US)

( * ) Notice: Subject to any disclaimer, the term of this patent is extended or adjusted under 35 U.S.C. 154(b) by 122 days.

(21) Appl. No.: 10/693,610

(22) Filed: Oct. 27, 2003

(65) Prior Publication Data

US 2005/0087046 A1    Apr. 28, 2005

(51) Int. Cl.
    *B23B 31/20* (2006.01)
(52) U.S. Cl. .................. 279/4.08; 279/51; 279/134; 409/233
(58) Field of Classification Search ............. 279/4.07, 279/4.08, 4.12, 38, 51, 53, 58, 134, 135; 409/233
    See application file for complete search history.

(56) References Cited

U.S. PATENT DOCUMENTS

| | | | |
|---|---|---|---|
| 1,408,182 A * | 2/1922 | Elbe ........................... 279/38 |
| 1,463,176 A * | 7/1923 | Schieldge .................... 279/53 |
| 2,735,688 A * | 2/1956 | Duchesneau et al. ......... 279/53 |
| 2,788,980 A | 4/1957 | Black | |
| 2,851,274 A * | 9/1958 | Greer ......................... 279/2.03 |
| 2,860,547 A * | 11/1958 | Stephan ..................... 409/233 |
| 3,087,736 A | 4/1963 | Lukas | |
| 3,385,607 A | 5/1968 | Hughes | |
| 3,427,035 A | 2/1969 | Heldt | |
| 3,599,998 A | 8/1971 | Kiwalle et al. | |
| 3,687,468 A | 8/1972 | Skahen | |
| 3,712,386 A * | 1/1973 | Peters ........................ 173/46 |
| 3,724,563 A * | 4/1973 | Wickham et al. ........... 173/221 |
| 3,779,566 A | 12/1973 | Tarbox et al. | |
| 3,880,046 A | 4/1975 | Sessody | |
| 4,046,390 A | 9/1977 | Dunham | |
| 4,171,820 A | 10/1979 | Klancnik | |
| 4,477,095 A * | 10/1984 | Atkinson, III .............. 279/145 |
| 4,576,528 A * | 3/1986 | Sollami ....................... 408/140 |
| 4,699,389 A | 10/1987 | Buck | |
| 4,943,071 A | 7/1990 | Srebot et al. | |
| 4,971,339 A | 11/1990 | Treff | |
| 5,096,213 A * | 3/1992 | Terwilliger et al. ........... 279/51 |
| 5,149,111 A | 9/1992 | Han | |
| 5,330,224 A | 7/1994 | Terwilliger et al. | |
| 5,490,683 A | 2/1996 | Mickel et al. | |

(Continued)

FOREIGN PATENT DOCUMENTS

DE    470233    1/1929

(Continued)

*Primary Examiner*—Monica Carter
*Assistant Examiner*—Michael W. Talbot
(74) *Attorney, Agent, or Firm*—Pillsbury Winthrop Shaw Pittman LLP

(57) ABSTRACT

A force limiting workpiece holding device for holding a workpiece in a workpiece processing assembly having a spindle and a closer that applies a force, comprises a workpiece holder slidably mounted to the spindle. The workpiece holder includes a plurality of circumferentially-spaced gripping segments that are movable between expanded and contracted positions to grip and release a workpiece. A force limiting coupling structure includes a biasing structure having a spring force. The coupling structure is operatively mountable between the workpiece holder and the closer such that a force applied by the closer to move the gripping segments of the workpiece holder between the expanded and contracted positions is transferred to the workpiece holder through the coupling structure and the biasing structure thereof, whereby a resultant force being applied to the workpiece holder by the closer is limited to the spring force of the biasing structure.

26 Claims, 3 Drawing Sheets

U.S. PATENT DOCUMENTS

| | | |
|---|---|---|
| 5,549,308 A | 8/1996 | Bennett |
| 5,806,859 A | 9/1998 | Saccomanno, III |
| 6,193,591 B1 * | 2/2001 | Stahl et al. .................. 451/243 |
| 6,213,478 B1 * | 4/2001 | Nishikawa ................. 279/4.08 |
| 6,260,855 B1 * | 7/2001 | Curtis ......................... 279/51 |
| 6,270,087 B1 | 8/2001 | Mickel et al. |
| RE37,397 E | 10/2001 | Lloyd |
| 6,481,940 B1 * | 11/2002 | Prust et al. .................. 409/233 |
| 6,497,419 B1 * | 12/2002 | Varnau ....................... 279/141 |
| 6,554,288 B1 * | 4/2003 | Tomoni ....................... 279/51 |
| 6,629,697 B1 * | 10/2003 | Asai et al. .................. 279/134 |
| 2003/0184028 A1 * | 10/2003 | Schlotterer .................. 279/51 |

FOREIGN PATENT DOCUMENTS

| | | |
|---|---|---|
| DE | 538509 | 11/1931 |
| DE | 32 33 868 A1 | 3/1984 |
| DE | 198 26 885 A1 | 12/1999 |
| JP | 63-84804 | 4/1988 |
| JP | 6-308404 | 11/1994 |
| JP | 2002-46005 | 2/2002 |

* cited by examiner

FORCE LIMITING WORKPIECE HOLDING DEVICE

BACKGROUND OF THE INVENTION

1. Field of the Invention

The present invention relates to workpiece holding devices for holding a tool or workpiece in a workpiece processing assembly.

2. Description of Related Art

Workpiece holding devices, such as collet and jaw chucks, are used to clamp or grip workpieces or tools in workpiece processing assemblies such as turning machines. The workpiece holding devices include a number of circumferentially-spaced gripping segments that are movable between expanded and contracted positions to grip or release a workpiece or tool. A closer is operatively connected to the workpiece holding device to apply a force for moving the segments of the workpiece holding device between the expanded and contracted positions. Typically, a draw bar is rigidly coupled between the workpiece holding device and the closer such that actuation of the closer applies a force to the workpiece holding device via the draw bar.

The closer is often times in the form of a hydraulic closer. Hydraulic closers are advantageous in that they can exert large forces (with respect to pneumatic closers, for example), which in turn will grip the workpiece or tool very securely for a processing operation. However, when a delicate workpiece, such as a thin walled ring, is to be processed, the large forces exerted by the hydraulic closer easily distort the delicate workpiece. Typically, the operating force in hydraulic closers cannot be lowered enough to eliminate distorting the workpiece. Moreover, lowering the operating force to low levels causes the hydraulic closer to move extremely slow, thereby dramatically slowing down the cycle time for gripping the workpiece.

The present invention provides an improved workpiece holding device that is structured to limit the force that may be applied by a closer to the workpiece holding device so that thin walled or delicate workpieces may be gripped which may be otherwise subject to distortion.

BRIEF SUMMARY OF THE INVENTION

One aspect of the present invention relates to a force limiting workpiece holding device that is structured to limit an amount of force that may be applied by a closer to the workpiece holding device. This aspect of the invention provides a force limiting workpiece holding device for holding a workpiece in a workpiece processing assembly having a spindle and a closer that applies a force. The workpiece holding device comprises a workpiece holder slidably mounted to the spindle. The workpiece holder includes a plurality of circumferentially-spaced gripping segments that are movable between expanded and contracted positions to grip and release a workpiece. A force limiting coupling structure includes a biasing structure having a spring force. The coupling structure is operatively mountable between the workpiece holder and the closer such that a force applied by the closer to move the gripping segments of the workpiece holder between the expanded and contracted positions is transferred to the workpiece holder through the coupling structure and the biasing structure thereof, whereby a resultant force being applied to the workpiece holder by the closer is limited to the spring force of the biasing structure.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
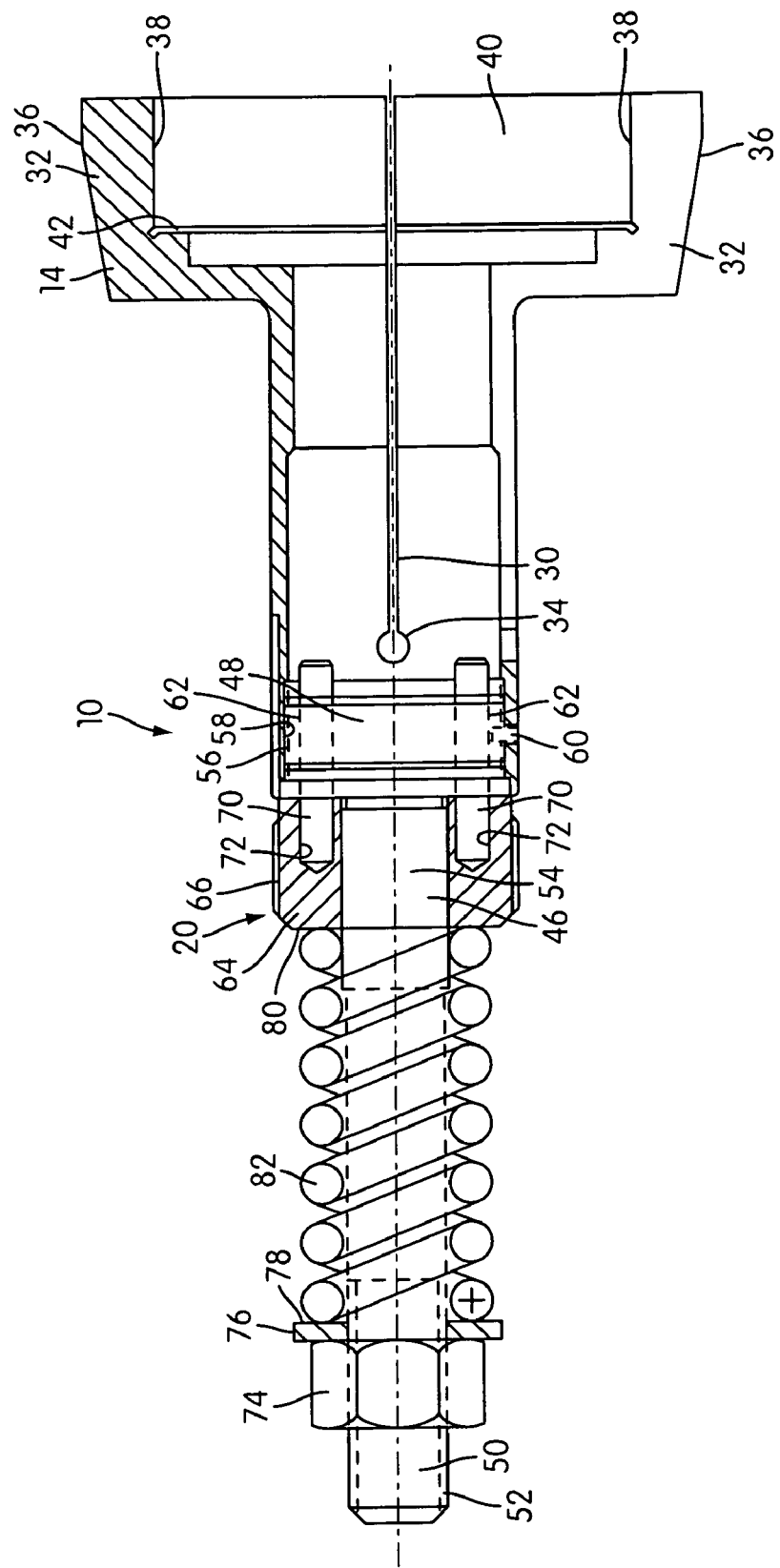
FIG. 1 is a cross-sectional view illustrating a force limiting workpiece holding device constructed in accordance with an embodiment of the invention.

FIGS. 1–4 illustrate a force limiting workpiece holding device 10 constructed according to an embodiment of the present invention. The workpiece holding device 10 is mounted in a workpiece processing assembly 12 for holding a tool or workpiece in the workpiece processing assembly 12. The workpiece processing assembly 12 may have any suitable configuration for performing a processing operation on a tool or workpiece. For example, the workpiece holding device 10 may be configured for use in workpiece processing assemblies 12 such as lathes, grinders, jigs, mills, and fixtures.

In the illustrated embodiment, the force limiting workpiece holding device 10 includes a workpiece holder 14 for gripping a workpiece. In the illustrated embodiment, the workpiece holder 14 is in the form of a step chuck collet having a draw-in configuration. The step chuck collet 14 is structured to grip the outer diameter of the workpiece by contracting to grip the workpiece and expanding to release the workpiece. Specifically, the step chuck collet 14 is configured to be pulled by a closer 16 into a tapered cap 18 which flexes the step chuck collet 14 in the radial direction and enables the step chuck collet 14 to grip a workpiece. The force limiting workpiece holding device 10 also includes a force limiting coupling structure 20 operatively mounted between the step chuck collet 14 and the closer 16. The force limiting coupling structure 20 is structured to limit an amount of force that may be applied by the closer 16 to the step chuck collet 14 so that thin walled or delicate workpieces may be gripped by the step chuck collet 14 which may be otherwise subject to distortion, as will be further discussed.

Figure 2:
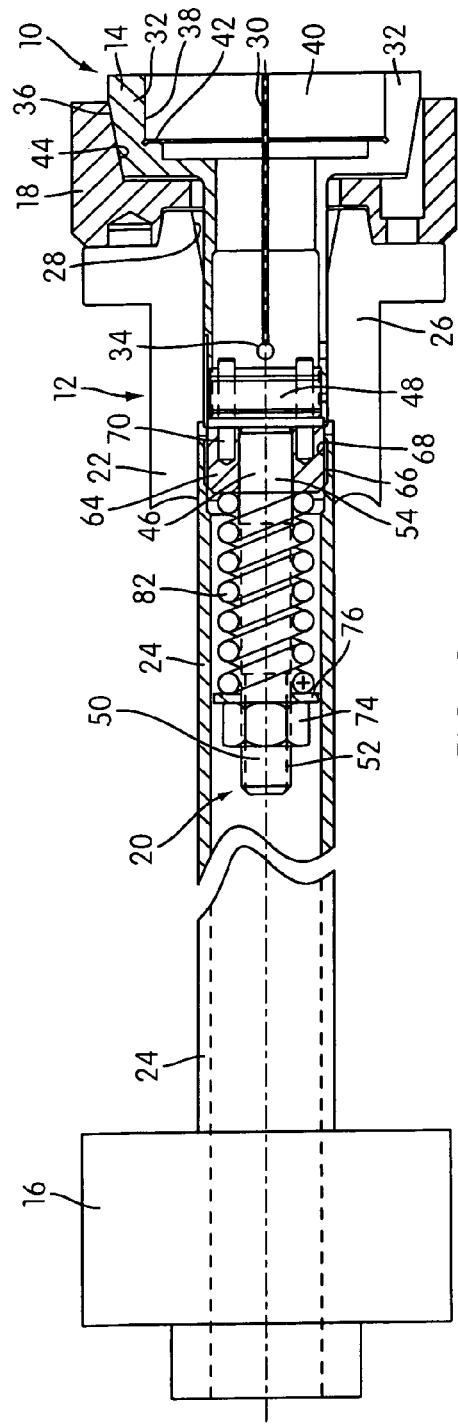
FIG. 2 is a partial cross-sectional view illustrating the workpiece holding device shown in FIG. 1 mounted to a workpiece processing assembly, the workpiece holding device in an expanded position.
Figure 3:
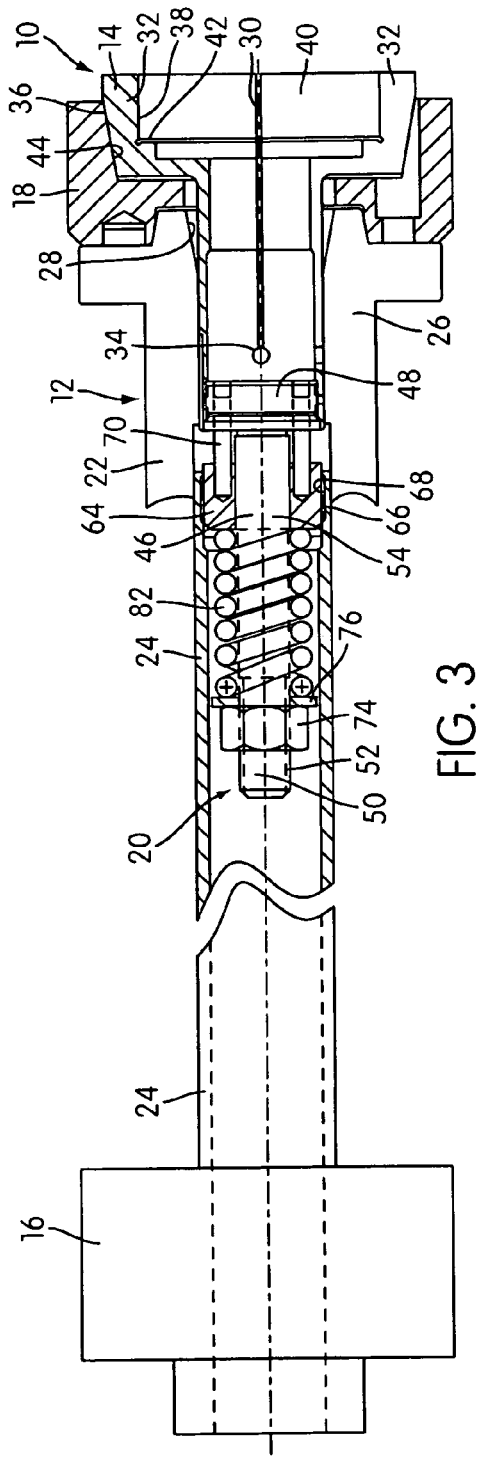
FIG. 3 is a partial cross-sectional view illustrating the workpiece holding device shown in FIG. 1 mounted to a workpiece processing assembly, the workpiece holding device in a contracted position.

As shown in FIGS. 2 and 3, the force limiting workpiece holding device 10 is mounted to a spindle 22 and a selectively axially extendible draw bar 24 of the workpiece processing assembly 12. The spindle 22 may have any suitable construction for performing a workpiece processing operation. The spindle 22 includes a mount 26 having a forward end with an inner axially extending bore 28 that is aligned with an axis of the spindle 22. The step chuck collet 14 of the force limiting workpiece holding device 10 is disposed inside the bore 28 of the mount 26 such that the step chuck collet 14 can slide axially within the bore 28 along the axis. The step chuck collet 14 is operatively connected to the selectively axially extendible draw bar 24 via the coupling structure 20. The draw bar 24 forms a part of the closer 16, whereby actuation of the closer 16 applies an axial force to the step chuck collet 14 through the draw bar 24 and coupling structure 20.

Specifically, the step chuck collet 14 of the force limiting workpiece holding device 10 includes a plurality of slots 30 that provide a plurality of circumferentially-spaced gripping segments 32, e.g., three or four gripping segments. The segments 32 are flexible between an expanded or open position to release or receive a workpiece (FIG. 2) and a contracted or closed position to grip a workpiece (FIG. 3). In the illustrated embodiment, the step chuck collet 14 has slots 30 with a relief hole 34. The relief hole 34 adds additional flexibility to allow the step chuck collet 14 to spread more. However, the slots 30 may not include a relief hole 34. Also, the slots 30 may have any other suitable configuration.

Each of the gripping segments 32 has an outwardly facing cam surface 36. In the illustrated embodiment, the cam surfaces 36 have a frustro-conical shape with constant rates of taper. The cam surfaces 36 taper radially outwardly away from the forward end of the spindle 22. However, the cam surfaces 36 may have any other suitable shape, e.g., varying taper.

Inwardly facing surfaces 38 of the gripping segments 32 cooperate to define an axially extending order hole 40 of the step chuck collet 14. The order hole 40 is aligned with the axis of the spindle 22 and is adapted to have a workpiece or tool inserted therein. The order hole 40 may have any suitable configuration for gripping a workpiece. That is, the order hole 40 may have any suitable sized inside diameter and the inner surface thereof may have any suitable finish, e.g., smooth, serrated, etc.

The step chuck collet 14 also provides an internal stop surface 42 that engages the end of a workpiece to limit its rearward position within the order hole 40.

A tapered cap 18, i.e., step chuck closer, is rigidly mounted, e.g., by fasteners, to the spindle 22 radially outwardly from the step chuck collet 14. The tapered cap 18 has an inwardly facing cam surface 44. In the illustrated embodiment, the cam surfaces 44 have a frustro-conical shape with constant rates of taper. The cam surfaces 44 taper radially outwardly away from the forward end of the spindle 22. However, the cam surfaces 44 may have any other suitable shape, e.g., varying taper.

The outwardly facing cam surfaces 36 of the step chuck collet 14 slidably engage the inwardly facing cam surfaces 44 of the tapered cap 18. The cam surfaces 36, 44 are suitably tapered such that when the step chuck collet 14 is moved axially inwardly (towards the left in FIG. 3) by the closer 16, the cam surfaces 36 of the step chuck collet 14 interact with the corresponding cam surfaces 44 on the tapered cap 18 which causes the gripping segments 32 of the step chuck collet 14 to contract radially inwardly, thus causing the step chuck collet 14 to grip the workpiece. Similarly, when the step chuck collet 14 is moved axially outwardly (towards the right in FIG. 2) by the closer 16, the cam surfaces 36 of the step chuck collet 14 interact with the corresponding cam surfaces 44 on the tapered cap 18 which allows the gripping segments 32 of the step chuck collet 14 to expand radially outwardly, thus allowing the step chuck collet 14 to release the workpiece or receive a workpiece in order hole 40 thereof.

The closer 16 may have any suitable configuration for applying an axial force to contract and expand the step chuck collet 14. For example, the closer 16 may be mechanically operated, pneumatically operated, or hydraulically operated. However, it is particularly advantageous to utilize the force limiting workpiece holding device 10 with a hydraulic closer. As discussed in the background section of the application, hydraulic closers typically operate at high pressures which can easily distort thin-walled or delicate workpieces. The force limiting workpiece holding device 10 is structured such that the closer 16 can operate at the higher pressures, but the resultant force being applied to the step chuck collet 14 is limited to a predetermined amount due to the coupling structure 20 connected between the step chuck collet 14 and the draw bar 24 associated with the closer 16.

That is, the closer 16 may apply a relatively high force, e.g., 20,000 lbs., but the resultant force that is transferred to the step chuck collet 14 is limited to a relatively low force, e.g., 1,000 lbs., due to the coupling structure 20. This enables a workpiece processing assembly having a closer 16 operating at high pressures, e.g., hydraulic closer, to handle thin-walled or delicate workpieces without distorting them and without compromising cycle time.

Figure 4:
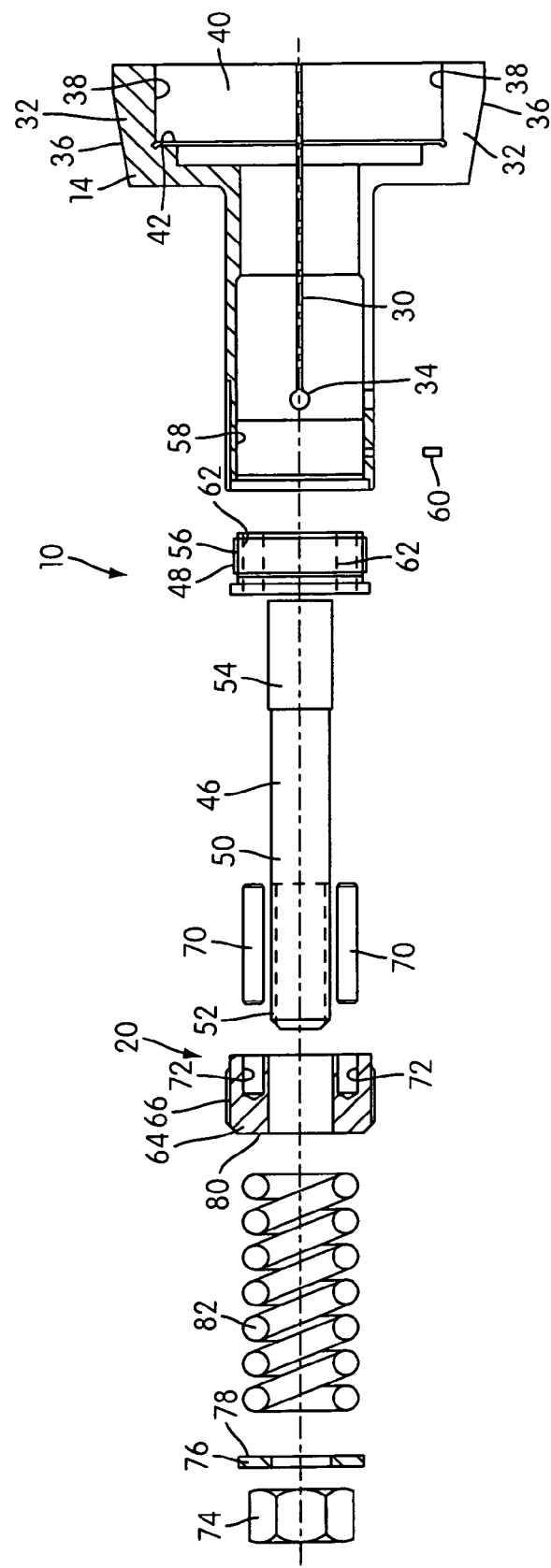
FIG. 4 is an exploded view of the workpiece holding device shown in FIG. 1.

As shown in FIG. 4, the coupling structure 20 includes an elongated stem 46 that is connected to an end of the step chuck collet 14. Specifically, the stem 46 includes a head 48 at one end thereof and a shaft 50 having a threaded portion 52 and a raised mounting portion 54. The head 48 has threads 56 on the outwardly facing surface thereof. The end of the step chuck collet 14 has threads 58 on the inwardly facing surface thereof, which allows the head 48 to be threadably engaged with end of the step chuck collet 14 thereby coupling the stem 46 to the step chuck collet 14. A pin 60 extends through aligned openings in the step chuck collet 14 and the head 48 to prevent inadvertent disengagement of the step chuck collet 14 and stem 46. The head 48 of the stem 46 also includes a pair of openings 62 therethrough.

A cylindrical coupler 64, in the form of a bushing, is slidably mounted to the raised mounting portion 54 of the stem 46. The coupler 64 is also operatively connected to the draw bar 24 associated with the closer 16 such that an axial force applied by the draw bar 24 moves the coupler 64 axially with respect to the mounting portion 54 of the stem 46. In the illustrated embodiment, the coupler 64 has threads 66 on the outwardly facing surface thereof that threadably engage inwardly facing threads 68 provided on the draw bar 24, thereby coupling the coupler 64 to the draw bar 24 and closer 16 associated therewith. However, the coupler 64 may be connected to the draw bar 24 in any other suitable manner, e.g., welding. Moreover, although one possible exemplary configuration of the draw bar 24 is illustrated in the FIGS. 2 and 3, the configuration may vary, and may take many forms. In general, the coupler 64 is structured to connect to a draw bar of any configuration.

Also, the coupler 64 includes a pair of pins 70, e.g., dowel pins, rigidly connected thereto. In the illustrated embodiment, the coupler 64 includes a pair of openings 72 that are adapted to receive the pins 70 therein with a friction fit. However, the pins 70 may be coupled to the coupler 64 in any other suitable manner. When the coupler 64 is slidably engaged with the stem 46, the pins 70 on the coupler 64 slidably engage within respective openings 62 provided in the head 48 of the stem 46. In use, as the coupler 64 is moved axially along with the draw bar 24, the pins 70 slide relative to the head 48 of the stem 46. The pins 70 have a suitable length such that the range of movement of the coupler 64 is less than the length of the pins 70. This ensures that the pins 70 will not disengage from the openings 62 in the head 48 of the stem 46. The pins 70 help to maintain alignment between the coupler 64 and the step chuck collet 14 which is connected to the stem 46.

However, the function of the pins 70 of the coupler 64 may be performed by outwardly extending projections of any suitable shape and the head 48 of the stem 46 may be provided with openings of a suitable size and shape to accommodate those projections.

A fastener 74, e.g., hex nut, is threadably engaged with the threaded portion 52 of the stem 46 to support a spacer 76, e.g., a washer. The spacer 76 defines a first spring support surface 78 on one side thereof. The coupler 64 defines a second spring support surface 80 on one side thereof. A biasing structure 82 is positioned between the spacer 76 and the coupler 64 such that one end of the biasing structure 82 rests on the first spring support surface 78 and the opposite end of the biasing structure 82 rests on the second spring support surface 80. As a result, an axial force applied by the closer 16 to move the gripping segments 32 of the step chuck collet 14 between the expanded and contracted positions is transferred from the draw bar 24 associated with the closer 16 to the coupler 64 rigidly connected thereto, from the coupler 64 through the biasing structure 82 and to the spacer 76, and from the spacer 76 to the stem 46 and step chuck collet 14 rigidly connected thereto. That is, as the draw bar 24 is retracted (to the left in FIG. 3), the applied force is transferred through the biasing structure 82 to the step chuck collet 14, thereby contracting the biasing structure 82 depending on the amount of force being applied. This arrangement limits the resultant axial force being applied to the step chuck collet 14 by the closer 16 to the spring force of the biasing structure 82.

In the illustrated embodiment, the biasing structure 82 is in the form of a compression spring having a spring force. The spring force is generally equal to the force required to fully compress the spring 82. The spring 82 can be customized to regulate the applied force to the step chuck collet 14 as dictated by the application. For example, if the workpiece to be processed cannot manage more than 1000 lbs. of force, for example, a spring 82 with a spring force of no more than 1000 lbs. is selected. In use, the axial force applied by the closer 16 is transferred through the spring 82 to the step chuck collet 14, thereby limiting the applied force to the step chuck collet 14 to the spring force, i.e., 1000 lbs. Thus, the user is not limited to the applicable force of the closer 16, which can be too high for thin-walled or delicate workpieces. Moreover, the user does not have to adjust the closer force and compromise cycle time.

As noted above, the spring 82 can be customized to regulate the applied force to the step chuck collet 14. For example, the characteristics of the spring may be selected to suit a particular application, e.g., length of spring, number of coils, materials of spring, cross-sectional area of spring wire, etc. Also, different types of springs may be used, e.g., wave washer, etc. Further, more than one spring may be used to customize the applied force to the step chuck collet 14. In use, the fastener 74 may be adjusted along the threaded portion 52 of the stem 46 to pretension the biasing structure 82.

The force limiting workpiece holding device 10 is configured such that the allowable stroke length of the coupler 64 with respect to the stem 46 is sufficiently larger than the stroke length of the closer 16. This ensures that the coupler 64 will not fully compress the spring 82 or move into engagement with the spacer 76, at which point the applied force of the closer 16 will be directly applied to the step chuck collet 14. Thus, the longer stroke length of the coupler 64 ensures that the applied force from the closer 16 to the step chuck collet 14 is limited to the spring force of the spring 82.

For example, hydraulic closers have a piston/cylinder arrangement that provides a finite stroke length, or range of movement. As long as the coupler 64 has a range of movement with respect to the stem 46 that is sufficiently larger than the stroke length of the closer 16, then the largest force that can be applied to the step chuck collet 14 is the spring force of the spring 82.

In the illustrated embodiment, the components of the force limiting workpiece holding device 10, with the exception of the biasing structure 82, are typically machined from carbonized steel to appropriate tolerances and then heat treated to desired hardnesses. For example, the components may be constructed of 8620 carbonized heat treated steel with Rockwell hardness about 58–62. However, any suitable materials and processes may be used to form the various components of the force limiting workpiece holding device 10. Also, the various components can be made in a variety of sizes in order to accommodate differently sized workpiece holders 14, e.g., differently sized step collet chucks.

It should be understood that the workpiece holder 14 of the force limiting workpiece holding device 10 may have any suitable configuration besides a step chuck collet. For example, the workpiece holder 14 may be in the form of any other suitable chuck, e.g., collet chucks and jaw chucks. Also, although the workpiece holder 14 illustrated has a draw-in to close configuration, it is contemplated that the workpiece holder 14 may be modified to include a push-out to close configuration, wherein the biasing structure 82 of the coupling structure 20 would be operatively positioned between the draw bar 24 and the workpiece holder 14 such that force being applied by the draw bar 24 is transmitted through the biasing structure 82. Further, although the workpiece holder 14 is structured to grip the outwardly facing surface of a workpiece, it is contemplated that the workpiece holder 14 may be modified to grip the inwardly facing surface of a workpiece.

Thus, the principles of the force limiting workpiece holding device 10 may be applied to any suitable workpiece holder that utilizes a closer to axially move the workpiece holder for expanding and contracting the gripping segments thereof.

Also, it should be understood that the force limiting workpiece holding device 10 may be retrofit to any suitable workpiece processing assembly to limit the applied force from a closer to the workpiece holder.

It can thus be appreciated that the aspects of the present invention have been fully and effectively accomplished. The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A force limiting workpiece holding device for use in holding a workpiece in a workpiece processing assembly having a spindle and a hydraulic closer that applies a force, the workpiece holding device comprising:

a workpiece holder slidably mountable to the spindle, the workpiece holder including a plurality of circumferentially-spaced gripping segments that are movable between gripping and released positions to grip and release a workpiece; and a force limiting coupling structure including a biasing structure having a spring force, the coupling structure operatively mountable between the workpiece holder and the hydraulic closer such that a force applied by the hydraulic closer to move the gripping segments of the workpiece holder from the released to the gripping positions is transferred to the workpiece holder through the biasing structure thereof, wherein the force limiting coupling structure is constructed and arranged to limit a resultant force being applied to the workpiece holder by the hydraulic closer to move the segments toward the gripping position to the spring force of the biasing structure.

2. A force limiting workpiece holding device according to claim 1, wherein the workpiece holder is a step chuck collet.

3. A force limiting workpiece holding device according to claim 1, wherein the workpiece holder includes a draw-in to close configuration.

4. A force limiting workpiece holding device according to claim 1, wherein the workpiece holder is structured to grip an outer diameter of the workpiece.

5. A force limiting workpiece holding device according to claim 1, wherein the workpiece holder includes outwardly facing cam surfaces that slidably engage inwardly facing cam surfaces provided on a tapered cap mounted to the spindle, the cam surfaces being suitably tapered such that when the workpiece holder is moved by the hydraulic closer into engagement with the tapered cap the cam surfaces of the workpiece holder interact with the cam surfaces on the tapered cap which causes the gripping segments of the workpiece holder to contract, thus causing the workpiece holder to grip the workpiece.

6. A force limiting workpiece holding device according to claim 1, wherein the coupling structure is operatively mountable to a hydraulic closer that includes a draw bar that interconnects the hydraulic closer and the coupling structure such that actuation of the hydraulic closer applies a force to the workpiece holder through the draw bar and coupling structure.

7. A force limiting workpiece holding device according to claim 1, wherein the biasing structure is a compression spring.

8. A force limiting workpiece holding device according to claim 1, wherein the coupling structure further comprises:

an elongated stem having one end mounted to the workpiece holder and an opposite end coupled to a spacer providing a first support surface; and a coupler slidably mounted to the elongated stem between the spacer and workpiece holder, the coupler providing a second support surface and being operatively connectable to the hydraulic closer such that a force applied by the hydraulic closer moves the coupler with respect to the stem, wherein the biasing structure is positioned between the spacer and the coupler such that one end of the biasing structure rests on the first support surface and the opposite end of the biasing structure rests on the second support surface, wherein a force applied by the hydraulic closer to move the gripping segments of the workpiece holder between the gripping and released positions positions is transferred from the closer to the coupler operatively connected thereto, from the coupler through the biasing structure and to the spacer, and from the spacer to the stem and workpiece holder mounted thereto.

9. A force limiting workpiece holding device according to claim 8, wherein the coupler has a stroke length with respect to the stem that is larger than a stroke length of the hydraulic closer.

10. A force limiting workpiece holding device according to claim 8, wherein the coupling structure includes a fastener threadably engaged with the opposite end of the stem to support the spacer, the fastener being adjustable with respect to the stem to adjust the position of the spacer thereby pretensioning the biasing structure.

11. A force limiting workpiece holding device according to claim 8, wherein the coupler includes outwardly extending projections that slidably engage within openings provided in the one end of the stem mounted to the workpiece holder.

12. A force limiting workpiece holding device according to claim 11, wherein outwardly extending projections are pins rigidly connected to the coupler.

13. A workpiece processing assembly comprising:

a spindle;

a hydraulic closer mounted to the spindle and structured to apply a force; and a force limiting workpiece holding device mounted to the spindle, the force limiting workpiece holding device comprising:

a workpiece holder slidably mounted to the spindle, the workpiece holder including a plurality of circumferentially-spaced gripping segments that are movable between gripping and released positions to grip and release a workpiece; and a force limiting coupling structure including a biasing structure having a spring force, the coupling structure operatively mounted between the workpiece holder and the hydraulic closer such that a force applied by the hydraulic closer to move the gripping segments of the workpiece holder from the released to the gripping positions is transferred to the workpiece holder through the biasing structure such that a resultant force being applied to the workpiece holder by the hydraulic closer to move the segments toward the gripping position is limited to the spring force of the biasing structure.

14. A workpiece processing assembly according to claim 13, wherein the workpiece holder is a step chuck collet.

15. A workpiece processing assembly according to claim 13, wherein the workpiece holder includes a draw-in to close configuration.

16. A workpiece processing assembly according to claim 13, wherein the workpiece holder is structured to grip an outer diameter of the workpiece, the gripping position comprises a contracted position, and the released position comprises an expanded position.

17. A workpiece processing assembly according to claim 16, wherein the workpiece holder includes outwardly facing cam surfaces that slidably engage inwardly facing cam surfaces provided on a tapered cap mounted to the spindle, the cam surfaces being suitably tapered such that when the workpiece holder is moved by the hydraulic closer into engagement with the tapered cap the cam surfaces of the workpiece holder interact with the cam surfaces on the tapered cap which causes the gripping segments of the workpiece holder to contract, thus causing the workpiece holder to grip the workpiece.

18. A workpiece processing assembly according to claim 13, wherein the hydraulic closer includes a draw bar that interconnects the closer and the coupling structure, wherein actuation of the hydraulic closer applies a force to the workpiece holder through the draw bar and coupling structure.

19. A workpiece processing assembly according to claim 13, wherein the biasing structure is a compression spring.

20. A workpiece processing assembly according to claim 13, wherein the coupling structure further comprises:
   an elongated stem having one end mounted to the workpiece holder and an opposite end coupled to a spacer providing a first support surface; and
   a coupler slidably mounted to the elongated stem between the spacer and workpiece holder, the coupler providing a second support surface and being operatively connected to the hydraulic closer such that a force applied by the hydraulic closer moves the coupler with respect to the stem,
   wherein the biasing structure is positioned between the spacer and the coupler such that one end of the biasing structure rests on the first support surface and the opposite end of the biasing structure rests on the second support surface, wherein a force applied by the hydraulic closer to move the gripping segments of the step chuck collet from the released to the gripping positions is transferred from the draw bar associated with the hydraulic closer to the coupler operatively connected thereto, from the coupler through the biasing structure and to the spacer, and from the spacer to the stem and workpiece holder mounted thereto.

21. A workpiece processing assembly according to claim 20, wherein the coupler has a stroke length with respect to the stem that is larger than a stroke length of the hydraulic closer.

22. A workpiece processing assembly according to claim 20, wherein the coupling structure includes a fastener threadably engaged with the opposite end of the stem to support the spacer, the fastener being adjustable with respect to the stem to adjust the position of the spacer thereby pretensioning the biasing structure.

23. A workpiece processing assembly according to claim 20, wherein the coupler includes outwardly extending projections that slidably engage within openings provided in the one end of the stem mounted to the workpiece holder.

24. A workpiece processing assembly according to claim 23, wherein the outwardly extending projections are pins rigidly connected to the coupler.

25. A method for holding a workpiece in a workpiece processing assembly having a spindle and a hydraulic closer that applies a force, the method comprising:
   slidably mounting a workpiece holder to the spindle, the workpiece holder including a plurality of circumferentially-spaced gripping segments that are movable between gripping and released positions to grip and release a workpiece; and
   applying a force with the hydraulic closer through a biasing structure to the workpiece holder so as to move the gripping segments of the workpiece holder from the released to the gripping positions, wherein a resultant force being applied to the workpiece holder by the hydraulic closer to grip the workpiece is limited to a spring force of the biasing structure.

26. A workpiece processing assembly according to claim 13, wherein the hydraulic closer is adapted to apply a closing force to the workpiece holder to move the gripping segments to the gripping position.

* * * * *